June 10, 1969 H. IRMLER ET AL 3,449,649
S.C.R. WITH EMITTER ELECTRODE SPACED FROM SEMICONDUCTOR EDGE EQUAL TO 10 TIMES BASE THICKNESS
Filed June 28, 1967
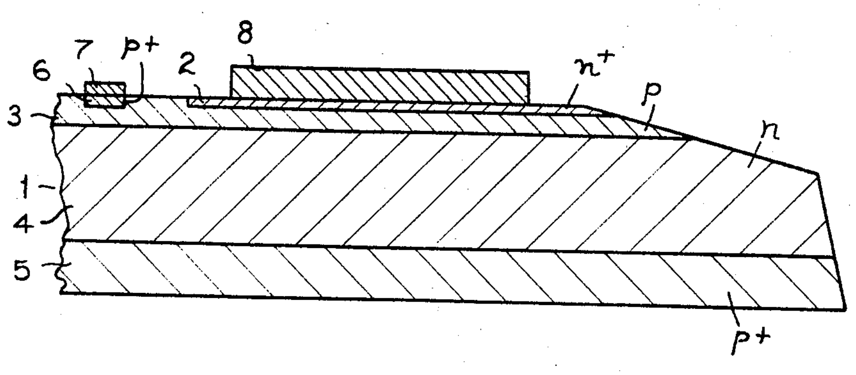
INVENTORS
Horst Irmler
Bernhard Voss
BY Pierce, Scheffler & Parker
Attorneys United States Patent Office 3,449,649

Patented June 10, 1969

3,449,649

S.C.R. WITH EMITTER ELECTRODE SPACED FROM SEMICONDUCTOR EDGE EQUAL TO 10 TIMES BASE THICKNESS

Horst Irmler, Mannheim, and Bernhard Voss, Viernheim, Germany, assignors to Aktiengesellschaft Brown, Boveri & Cie, Baden, Switzerland, a joint-stock company Filed June 28, 1967, Ser. No. 649,629
Claims priority, application Germany, July 9, 1966, B 87,937
Int. Cl. H01l *11/04*
U.S. Cl. 317—235
4 Claims

ABSTRACT OF THE DISCLOSURE

A semiconductor element comprises a body of monocrystalline semiconductor material which includes therein a plurality of adjacent zones having alternating conductivity and a control electrode is provided on an inner zone which adjoins an outer zone that serves as the emitter. This outer zone extends at least partly to the edge of the semiconductor body and has a contact layer applied thereto but which does not extend up to the edge of the semiconductor body. The distance of the edge from the contact layer is at least 10 fold the thickness of the inner zone adjoining the outer zone and amounts to at least 0.3 mm., and is preferably from 1 to 2 mm. The outer zone is also not contacted by the contact layer in the region adjoining the control electrode.

The present invention relates to an improvement in semiconductor elements of the type incorporating a body of monocrystalline semiconductor material which includes a plurality of adjacent zones having alternating conductivity characteristics, and at least one control electrode.

A semiconductor element of this general type is already known wherein the contact for the emitter component is set back in the range adjoining the control electrode. Due to this measure, a transverse field is formed immediately after ignition in the base zone adjoining the emitter, which is responsible for rapid ignition propagation-velocity. In this manner, the semiconductor elements are enabled to withstand higher current rising velocities without destruction. This technique is described in Zeitschrift für angewandte Physik, vol. 19, pp. 396–400, 1965.

It has been discovered that this transverse field effect, known in itself, can be used for the self-protection of a semiconductor element against overvoltage if, according to the invention, at least one of the outer zones, the emitter, extends at least partly up to the edge of the semiconductor body and this outer zone is not contacted regionally in the part not adjoining the control electrode. In such a semiconductor element, the blocking current causes an arc-through of the semiconductor element in the forward direction in a steep rise as a result of an application of an overvoltage. By this means, damage to the semiconductor element is avoided.

Since the blocking current appears, as a rule, primarily as a surface-current at the p-n junction between zones, the outer zone is not contacted, according to a further feature of the invention, in the outer region of the part extending to the edge.

The arrangement of the transverse field emitter on the outer edge of the emitter surface ensures a high ignition propagation velocity which permits the semiconductor element, according to the invention, to withstand the high current velocities appearing in the presence of overvoltage peaks without destruction of the semiconductor element.

The arrangement of the improved transverse field emitter, according to the invention, can be realized preferably simultaneously with the known transverse field transmitter in one element.

According to the invention, the width of the uncontacted region of the outer zone is at least ten-fold the thickness of the adjacent base zone, i.e., at least 0.3 mm. and preferably from 1 to 2 mm.

A representative embodiment of a semiconductor element incorporating the inventive concept is illustrated in the attached drawing, the single figure of which is a somewhat schematic view through that portion of the body of the semiconductor element on which is located the control electrode and the emitter.

With reference now to the drawing, the semiconductor element is constituted by a disc-like body 1 of monocrystalline material, e.g., silicon, in which has been formed, by known techniques of doping, a plurality of adjacent zones of different conductivity characteristics. An outer zone 2 which serves as the emitter and extends over a portion of the upper surface of the disc 1 is highly n-conductive, i.e., n+. The next adjacent zone 3 which underlies zone 2 has a p-conductivity characteristic, the next adjacent zone 4 which underlies zone 3 has an n-conductivity characteristic, and the next adjacent zone 5 which underlies zone 4 is highly p-conductive, i.e., p+. A region 6 laterally displaced from the emitter zone 2 in the direction toward the center of the disc 1 is made highly p-conductive, i.e., p+, and is provided with a contact layer 7 to serve as the control electrode.

Another contact layer 8 is applied to a portion of the outer surface of zone 2 and is set back in a lateral direction from the outer tapered edge of the disc 1 to which edge the zone 2 itself reaches. Contact layer 8 is also set back, in known manner, in a lateral direction from that edge of zone 2 which faces in the direction of the control electrode contact 7.

The improved semiconductor element as represented in the drawing can thus be ignited by way of the surface blocking current and also as well by way of the control current, and with a high ignition propagation velocity for either mode of ignition thus enabling the semiconductor element to safely withstand high current rising velocities without being destroyed.

The spread, i.e., the area of the coverage of contact 8 on zone 2 according to the invention is produced preferably in such manner that, starting from a diffused semiconductor with a pn-pn structure which is covered with nickel and gold coatings, these coatings are removed in the desired regions by using well known techniques of masking and the like.

We claim:

1. In a semiconductor element which comprises a body of monocrystalline semiconductor material and includes therein a plurality of adjacent zones having an alternating conductivity characteristic and a control electrode provided on an inner zone which adjoins an outer zone, the improvement wherein said outer zone (2) extends at least partly to the edge of said semiconductor body and wherein said outer zone (2) is not contacted in a region extending up to the edge of said semiconductor body, the distance of the edge from a contact layer (8) on said outer zone (2) being at least ten fold the thickness of said inner zone (3) adjoining said outer zone (2).

2. A semiconductor element as defined in claim 1 wherein said uncontacted region of said outer zone (2) is at least 0.3 mm. and preferably from 1 to 2 mm.

3. A semiconductor element as defined in claim 1 wherein said outer zone (2) is, in addition, not contacted in the region adjoining said control electrode.

4. A semiconductor element as defined in claim 1 wherein said outer zone (2) which is contacted by a contact layer (8) serves as the emitter.

References Cited

UNITED STATES PATENTS

| | | | |
|---|---|---|---|
| 3,403,309 | 9/1968 | Longini | 317—235 |
| 3,327,183 | 6/1967 | Greenberg | 317—235 |
| 3,366,851 | 1/1968 | Herlet | 317—235 |

JOHN W. HUCKERT, *Primary Examiner.*

M. EDLOW, *Assistant Examiner.*

U.S. Cl. X.R.

307—305; 317—234